(12) United States Patent
Ochiai

(10) Patent No.: US 7,137,585 B2
(45) Date of Patent: Nov. 21, 2006

(54) FISHING LINE GUIDE MECHANISM FOR A SPINNING REEL

(75) Inventor: Koji Ochiai, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/180,697

(22) Filed: Jul. 14, 2005

(65) Prior Publication Data

US 2006/0027691 A1 Feb. 9, 2006

(30) Foreign Application Priority Data

Aug. 9, 2004 (JP) ............................. 2004-232007

(51) Int. Cl.
*A01K 89/01* (2006.01)
(52) U.S. Cl. .................................... 242/231
(58) Field of Classification Search ......... 242/230–233
See application file for complete search history.

(56) References Cited

U.S. PATENT DOCUMENTS 5,560,561 A * 10/1996 Henriksson ................. 242/231
5,954,284 A * 9/1999 Tsukihiji et al. ............. 242/231
5,984,219 A * 11/1999 Miyajima et al. ............ 242/231
6,149,087 A * 11/2000 Takeuchi ..................... 242/231
6,161,786 A 12/2000 Ohara et al.
6,227,474 B1 * 5/2001 Okada ......................... 242/231
2002/0079395 A1 6/2002 Matsuda

FOREIGN PATENT DOCUMENTS

EP 1 407 662 A1 8/2003
GB 2-320-997 A 7/1998
JP 08308444 11/1996

* cited by examiner

*Primary Examiner*—Kathy Matecki
*Assistant Examiner*—Evan Langdon
(74) *Attorney, Agent, or Firm*—Global IP Counselors, LLP

(57) ABSTRACT

A fishing line guide mechanism for a spinning reel includes a bail arm that has a bail, a first bail arm support member and a line roller. The line roller has a guide portion and a flange portion that extends radially outward from an end of the guide portion. The first bail arm support member includes an annular first projecting portion that projects from the first bail support member. The flange portion covers an outer periphery of the annular first projecting portion. The fishing line guide mechanism prevents fishing line from falling between the line roller and the first bail support member to prevent the fishing line from being damaged or cut.

20 Claims, 9 Drawing Sheets

FISHING LINE GUIDE MECHANISM FOR A SPINNING REEL

CROSS-REFERENCE TO RELATED APPLICATIONS

This application claims priority to Japanese Patent Application No. 2004-232007. The entire disclosure of Japanese Patent Application No. 2004-232007 is hereby incorporated herein by reference.

BACKGROUND OF THE INVENTION

1. Field of the Invention

The present invention generally relates to a mechanism for guiding fishing line. More specifically, the present invention relates to a mechanism for guiding fishing line onto a spool which is mounted to ends of a first and a second rotor arm and is pivoted between a line-guiding position and a line-release position.

2. Background Information

A spinning reel is provided with a fishing line guide mechanism that guides fishing line onto a spool. The fishing line guide mechanism is mounted to the front ends of first and second rotor arms. The fishing line guide mechanism rotates together with the rotor and is pivotably arranged between a line-releasing posture and a line-guiding posture. The fishing line guide mechanism includes first and second bail support members, a fixed shaft, a fixed shaft cover, a bail and a line roller. An end of the fixed shaft is fastened to a front end of the first bail support member. The fixed shaft cover is fastened to another end of the fixed shaft. The fixed shaft supports the line roller. One end of the bail is inserted into the fixed shaft cover and non-rotatably fastened to the fixed shaft. The other end of the bail is attached to a front end of the second bail support member.

When winding fishing line onto a spool with a spinning reel having the above fishing line guide mechanism, the bail is pivoted into the line-guiding posture and the handle is rotated. When this occurs, the fishing line is led by the bail and guided to contact the outer peripheral surface of the line roller. Then, guided by the line roller, the direction of the fishing line is changed, and the fishing line is wound around an outer periphery of the spool.

With this type of fishing line guide mechanism, in order to prevent the line from falling between the end of the line roller and the first bail support member, it is known to provide a projecting portion that annularly projects on the side facing the fixed shaft cover of the first bail support member. The projecting portion covers the end of the line roller by the inner peripheral portion of the projecting portion. (See, for example, Japanese Publication No. H8-308444.)

With the conventional fishing line guide mechanism described above, the end of the line roller is covered by the projecting portion of the first bail support member, and thus the fishing line can be prevented from entering into the gap between the end of the line roller and the first bail support member. However, when the drag is applied and the fishing line is pulled with a strong force, the fishing line, while being released, will come into contact with the projecting portion via the line roller. Thus, when the fishing line comes into contact with the projecting portion while being released, the fishing line will rub against the projecting portion and the fishing line may be damaged or cut.

In view of the above, it will be apparent to those skilled in the art from this disclosure that there exists a need for an improved fishing line guide mechanism that prevents fishing line from being damaged or cut. This invention addresses this need in the art as well as other needs, which will become apparent to those skilled in the art from this disclosure.

SUMMARY OF THE INVENTION

An object of the present invention is to prevent fishing line from falling between the line roller and the first bail support member of a fishing line guide mechanism of a spinning reel, and prevent the fishing line from being damaged or cut.

A fishing line guide mechanism for a spinning reel according to a first aspect of the present invention includes first and second rotor arms, first and second bail support members, a fixed shaft, a fixed shaft cover, a line roller and a bail. The first bail support member is pivotably mounted to a front end of the first rotor arm and has an annular first projecting portion. The second bail support member is pivotably mounted to a front end of the second rotor arm. One end of the fixed shaft is fixed to the first bail support member. The fixed shaft cover is formed on another rend of the fixed shaft in a spaced relationship with the first bail support member. The line roller is rotatably supported by the fixed shaft. The line roller includes a guide portion and a flange portion. The guide portion is configured to guide fishing line. The flange portion projects radially outward from an end portion of the guide portion closest to the first bail support member. The flange portion covers an outer periphery of the first projecting portion of the first bail support member. The bail has an end fixed to the second bail support member and another end fixed to at least one of the fixed shaft and the fixed shaft cover. The bail is curved outward in a circumferential direction to guide the fishing line to the line roller.

With this fishing line guide mechanism, the line roller has a flange portion that covers the outer periphery of the first projecting portion of the first bail support member. Thus, the fishing line is prevented from entering the gap between the end of the line roller and the first projecting portion of the first bail support member. In addition, when the drag is applied and the fishing line is pulled with a strong force, the fishing line, while being released, will come into contact with the flange portion of the line roller via the guide portion of the line roller. When this occurs, because the line roller will rotate in the fishing line release direction, and the fishing line will no longer rub on the first bail support portion, damage to or cutting of the fishing line can be prevented.

The fishing line guide mechanism according to a second aspect of the present invention is the fishing line guide mechanism of the first aspect of the present invention, wherein the line roller further has a first tubular portion that is formed to project axially outward from an end portion of the guide portion closest to the first bail support member, and is covered by an inner periphery of the first projecting portion.

The fishing line is prevented from entering into the interior of the first bail support member because the first tubular portion of the line roller is covered by the inner periphery of the first projecting portion of the first bail support member.

The fishing line guide mechanism according to a third aspect of the present invention is the fishing line guide mechanism of either the first or second aspect of the present invention, wherein the fixed shaft cover has an annular second projecting portion that is formed so as to face the first projecting portion. The line roller further has a second tubular portion that is formed to project axially outward from an end portion of the guide portion closest to the bail, and is covered by an inner periphery of the second projecting portion.

The fishing line is prevented from entering into the interior of the fixed shaft cover because the second tubular portion of the line roller is covered by the inner periphery of the second projecting portion of the fixed shaft cover.

The fishing line guide mechanism according to a fourth aspect of the present invention is the fishing line guide mechanism of any of the first through third aspects of the present invention, further including a line-pinch prevention portion that projects in the fixed shaft projecting direction further out than other portions of the first bail support member. The line-pinch prevention portion is arranged so as to cover an outer periphery of the flange portion to prevent fishing line from being pinched between the flange portion and the first projecting portion.

The fishing line is reliably prevented from being pinched between the flange portion and the first projecting portion because the outer periphery of the flange portion of the line roller is covered by the line-pinch prevention portion.

The fishing line guide mechanism according to a fifth aspect of the present invention is the fishing line guide mechanism of the fourth aspect of the present invention, wherein the line-pinch prevention portion is formed separately from the first bail support member.

In this configuration, formation of the line-pinch prevention portion is simplified.

The fishing line guide mechanism according to a sixth aspect of the present invention is the fishing line guide mechanism of the fourth aspect of the present invention, wherein the line-pinch prevention portion is unitarily formed with the first bail support member.

In this configuration, manufacturing costs are controlled by reducing the number of parts.

The fishing line guide mechanism according to a seventh aspect of the present invention is the fishing line guide mechanism of any of the fourth through sixth aspects of the present invention, further includes a line slack prevention portion that projects in the fixed shaft projecting direction more than other portions of the first bail support member, is unitarily formed with the line-pinch prevention portion so as to be smoothly continuous therewith, and prevents line slack.

In this configuration, even if the tension applied to the fishing line is weakened and line slack occurs in the area from the first bail support member to the first rotor arm side, the fishing line can be returned to the line roller by means of the line slack prevention portion.

A spinning reel according to an eighth aspect of the present invention includes a reel unit, a rotor, a spool and a fishing line guide mechanism. The rotor is rotatively supported on a front of the reel unit. The spool is disposed at a front of the rotor. The fishing line guide mechanism includes first and second rotor arms, first and second bail support members, a fixed shaft, a fixed shaft cover, a line roller and a bail. The first bail support member is pivotably mounted to a front end of the first rotor arm and has an annular first projecting portion. The second bail support member is pivotably mounted to a front end of the second rotor arm. One end of the fixed shaft is fixed to the first bail support member. The first shaft cover is formed on another rend of the fixed shaft in a spaced relationship with the first bail support member. The line roller is rotatably supported by the fixed shaft. The line roller includes a guide portion and a flange portion. The guide portion is configured to guide fishing line. The flange portion projects radially outward from an end portion of the guide portion closest to the first bail support member. The flange portion covers an outer periphery of the first projecting portion of the first bail support member. The bail has an end fixed to the second bail support member and another end fixed to at least one of the fixed shaft and the fixed shaft cover. The bail is curved outward in a circumferential direction to guide the fishing line to the line roller.

According to the present invention, because the line roller of a fishing line guide mechanism of a spinning reel has a flange portion that covers the outer periphery of a first projecting portion of a first bail support member, fishing line is prevented from dropping between the line roller and the first bail support member in order to avoid damage to and cutting of the fishing line.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
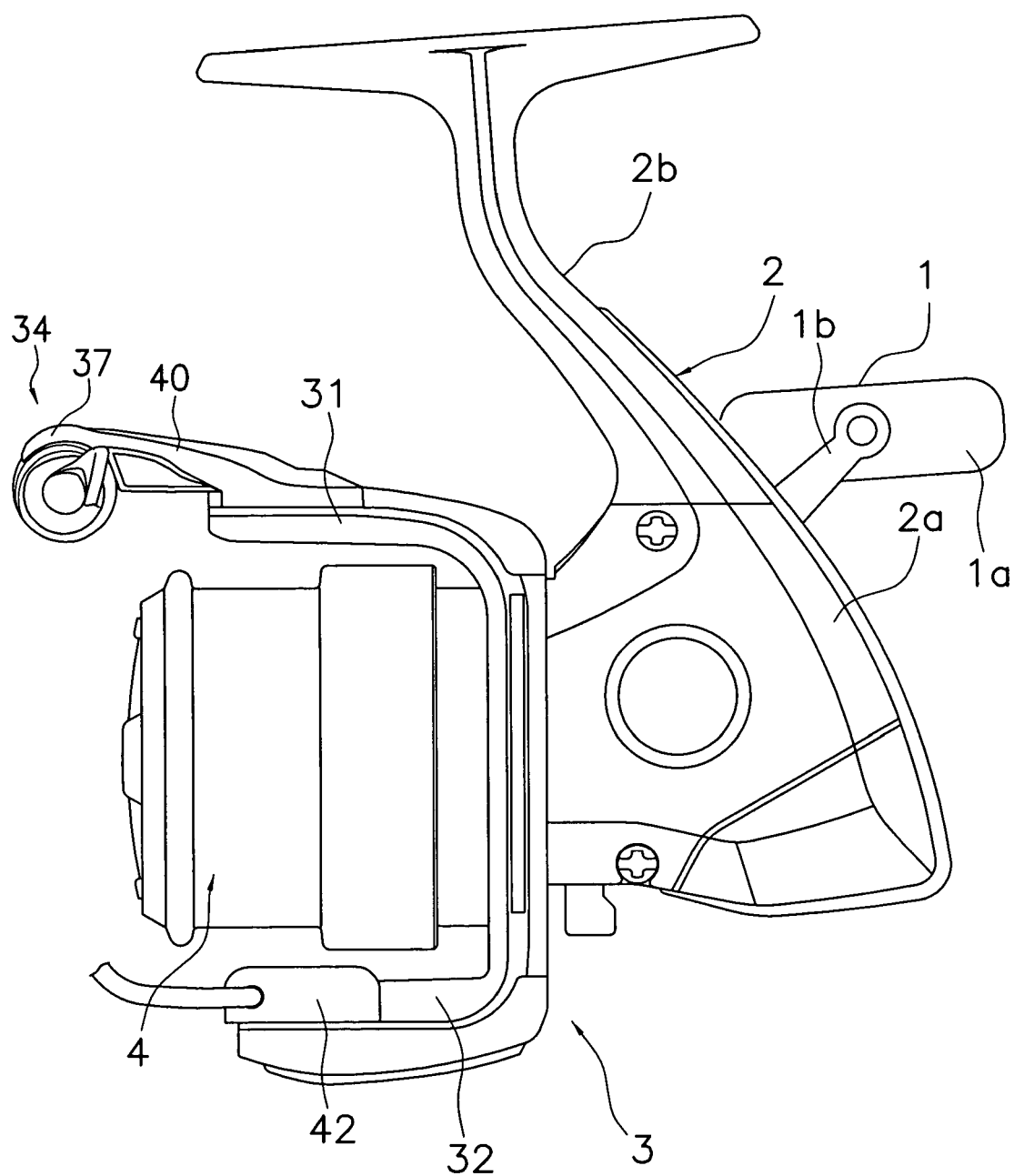
FIG. 1 is a side elevational view of a spinning reel equipped with a fishing line guide mechanism in accordance with a first embodiment of the present invention.
Figure 2:
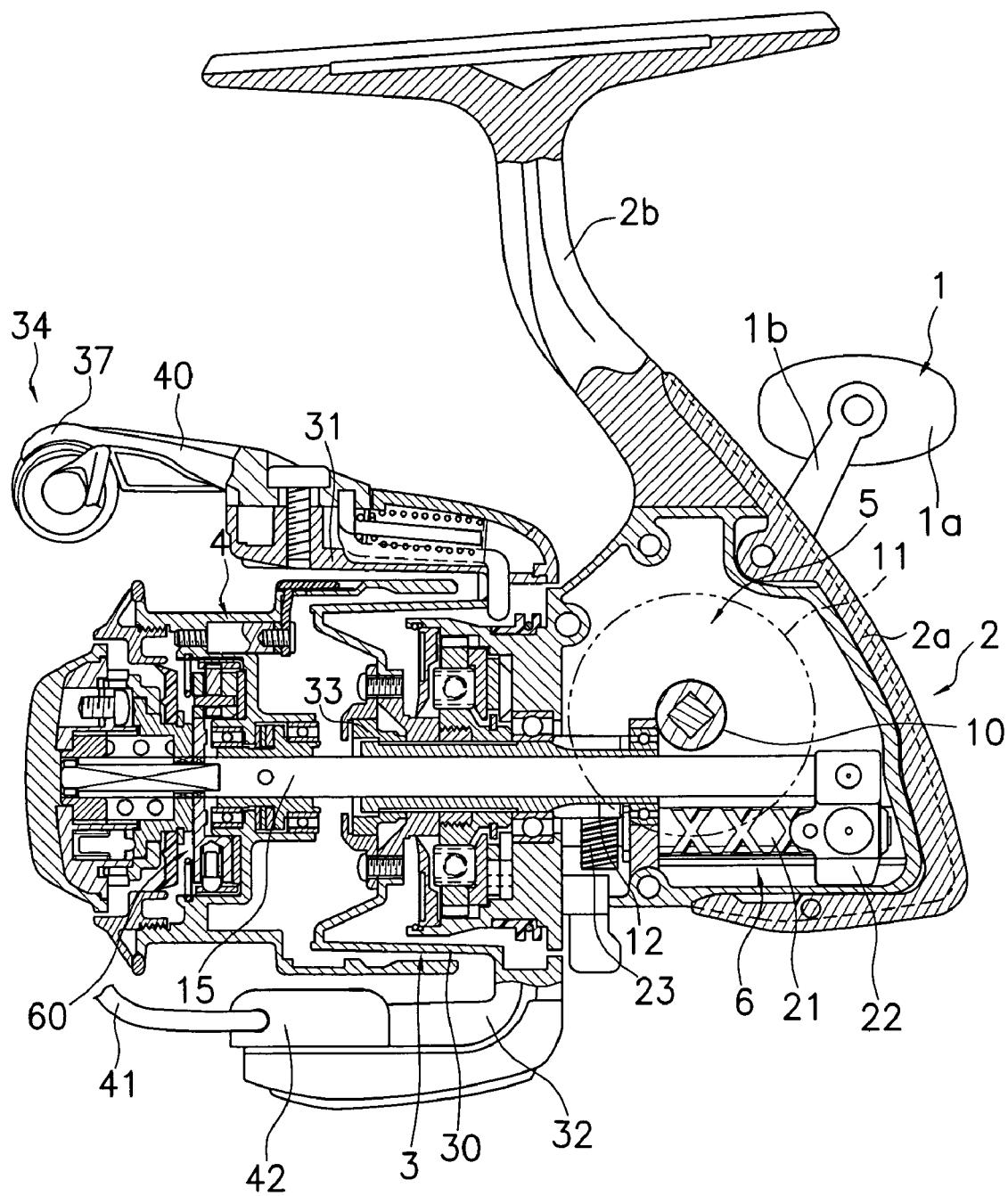
FIG. 2 is a side cross-sectional view of the spinning reel equipped with the fishing line guide mechanism illustrated in FIG. 1 in accordance with a first embodiment of the present invention.

Referring initially to FIG. 1, a spinning reel is illustrated in accordance with a first embodiment of the present invention. As shown in FIGS. 1 and 2, the spinning reel includes a handle 1, a reel unit 2, a rotor 3 and a spool 4. The reel unit 2 rotatively supports the handle 1. The rotor 3 includes a fishing line guide mechanism. The rotor 3 is rotatively supported at a front end of the reel unit 2. The spool 4 has fishing line wound around an outer peripheral surface thereof. The spool 4 is disposed on a front end of the rotor 3 so that it can be moved forward and backward. A center portion of the spool 4 is coupled to a front end of a spool shaft 15 via a drag mechanism 60.

Since most of the parts of the spinning reel are well known in the art, the parts of the spinning reel will not be discussed or illustrated in detail herein, except for the parts that relate to the present invention. In other words, only the parts related to the fishing line guide mechanism will be discussed and illustrated in detail herein. Moreover, various conventional spinning reel parts, which are not illustrated and/or discussed in detail herein, can be used in conjunction with the present invention.

The handle 1 includes a T-shaped grip portion 1a and an L-shaped crank arm 1b. A front end of the L-shaped crank arm 1b is rotatively attached to the grip portion 1a.

As shown in FIGS. 1 and 2, the reel unit 2 includes a reel body 2a and a T-shaped rod attachment leg 2b. The attachment leg 2b extends diagonally upward toward the front end of the reel unit 2. The attachment leg 2b is integrally formed with the reel body 2a. The reel body 2a has an opening on its side. As shown in FIG. 2, the reel body 2a has a rotor drive mechanism 5 and an oscillating mechanism 6. The reel body 2a has a mechanism accommodating space in the interior thereof that accommodates the rotor drive mechanism 5 and the oscillating mechanism 6. The rotor drive mechanism 5 transmits the rotation of the handle 1 to rotate the rotor 3. The oscillating mechanism 6 serves to uniformly wind-up the fishing line by shifting the spool 4 back and forth.

As shown in FIG. 2, the rotor drive mechanism 5 includes a handle shaft 10, a master gear 11 and a pinion gear 12. The handle 1 is non-rotatably mounted to the handle shaft 10. The master gear 11 rotates together with the handle shaft 10. The pinion gear 12 meshes with the master gear 11. Both ends of the handle shaft 10 are rotatively supported on the reel unit 2 via bearings. Both ends of the handle shaft 10 are respectively provided with female thread sets of different threaded direction and diameter. The handle 1 is selectively non-rotatively mounted to either one of the female thread sets.

The pinion gear 12 is formed into a hollow tubular shape. A front portion of the pinion gear 12 extends through a center portion of the rotor 3. The front portion of the pinion gear 12 is fixed to the rotor 3 by a nut 33. A middle section and a rearward end of the pinion gear 12 are each rotatively supported on the reel unit 2 by bearings.

As shown in FIG. 2, the oscillating mechanism 6 includes a worm gear 21, a slider 22 and an intermediate gear 23. The worm gear 21 is arranged substantially below the spool shaft 15. The worm gear 21 is substantially parallel to the spool shaft 15. The slider 22 moves back and forth along the worm gear 21. The intermediate gear 23 is fixed to the front end of the worm gear 21. A rearward end of the spool shaft 15 is non-rotatably fixed to the slider 22. The intermediate gear 23 meshes with the pinion gear 12.

As shown in FIG. 2, the rotor 3 includes a cylindrical portion 30. The fishing line guide mechanism of the rotor 3 of the spinning reel includes a first rotor arm 31, a second rotor arm 32 and a bail arm 34. The cylindrical portion 30 is fixed to the pinion gear 12. The first and second rotor arms 31 and 32 oppose each other on opposite sides of the cylindrical portion 30. As shown in FIGS. 1 and 2, the spool 4 is disposed between the first rotor arm 31 and the second rotor arm 32 of the rotor 3. The bail arm 34 serves as a fishing line guide mechanism for guiding the fishing line to the spool 4. The cylindrical portion 30 and the first and second rotor arms 31 and 32 are integrally formed together. The cylindrical portion 30 and the first and second rotor arms 31 and 32 are, for example, made of an aluminum alloy.

Referring to FIGS. 1–4, the bail arm 34 is disposed on front ends of the first rotor arm 31 and the second rotor arm 32. The bail arm 34 is pivotable between a line-guiding position and a line-release position. The bail arm 34 includes a first bail support member 40 and a second bail support member 42. The first and second bail support members 40 and 42 are pivotably mounted on a front end of the first rotor arm 31 and the second rotor arm 32, respectively. The first bail support member 40 is pivotably mounted on an outer side of the first rotor arm 31. The second bail support member 42 is pivotably mounted on an inner side of the second rotor arm 32.

Figure 3:
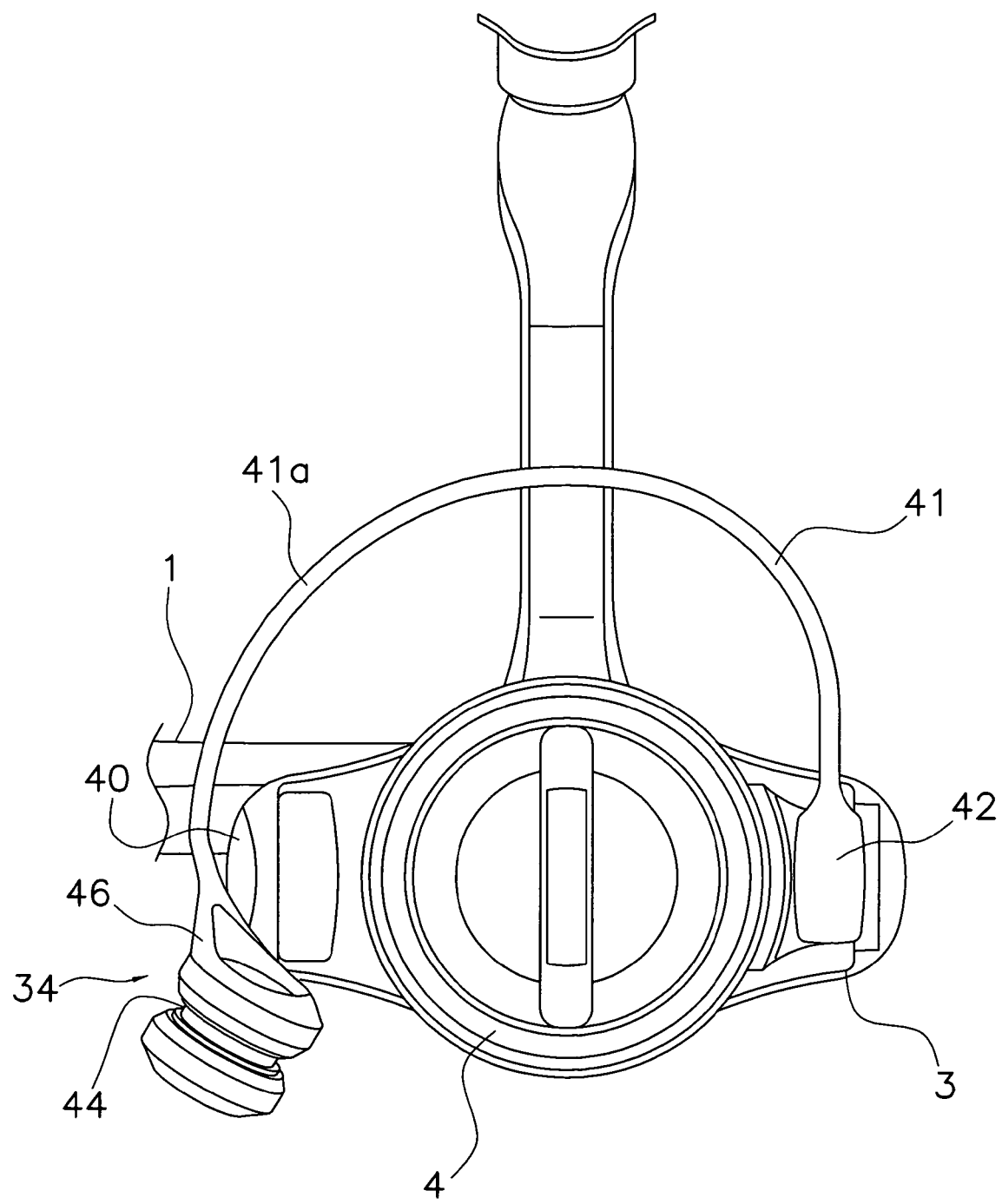
FIG. 3 is a front view of the spinning reel equipped with the fishing line guide mechanism illustrated in FIGS. 1 and 2 in accordance with a first embodiment of the present invention.
Figure 4:
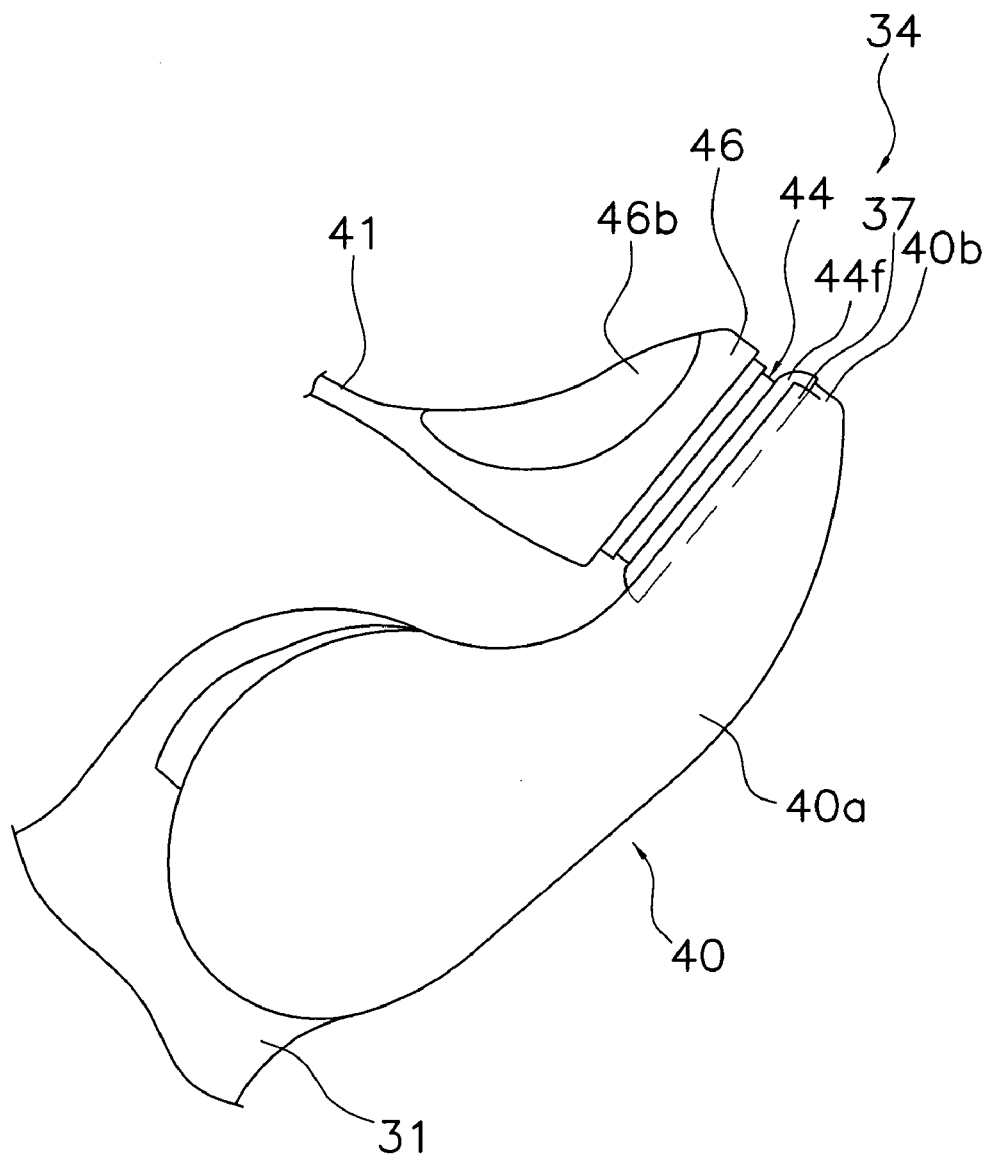
FIG. 4 is partial view of the fishing line guide mechanism illustrated in FIGS. 1–3 in accordance with a first embodiment of the present invention.
Figure 5:
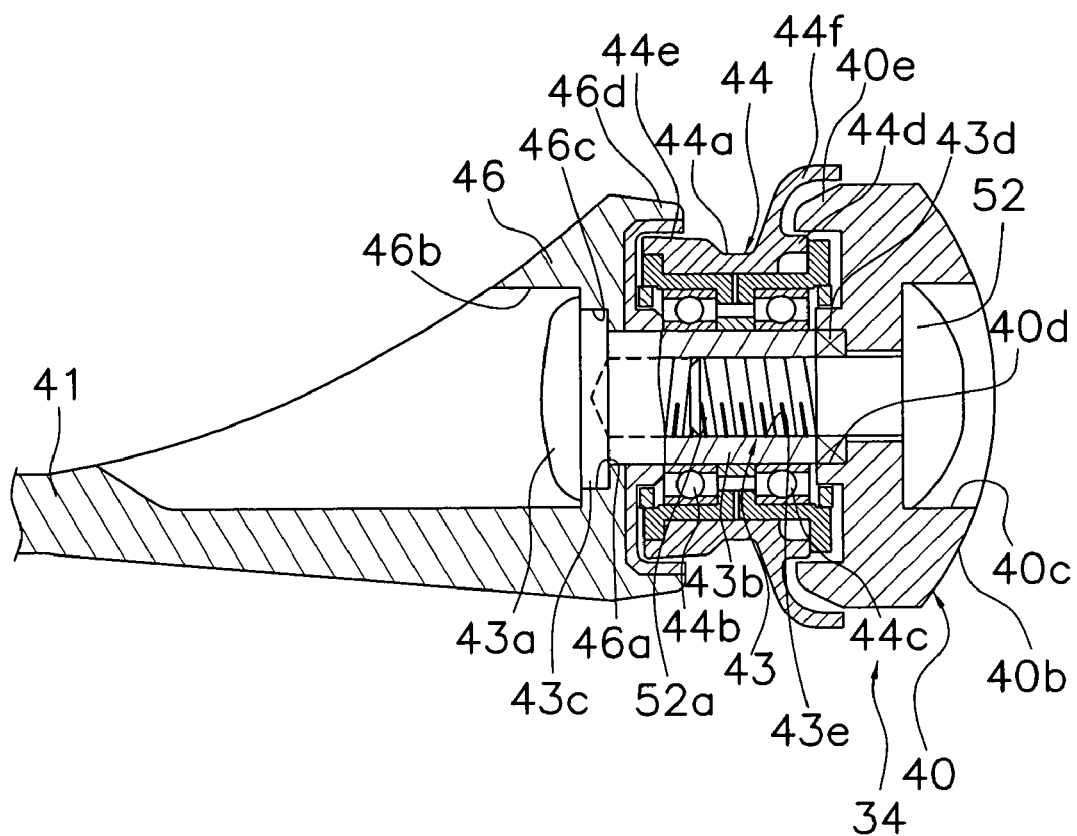
FIG. 5 is a partial vertical cross-sectional view of the principal elements of the fishing line guide mechanism illustrated in FIGS. 1–4 in accordance with a first embodiment of the present invention.
Figure 6:
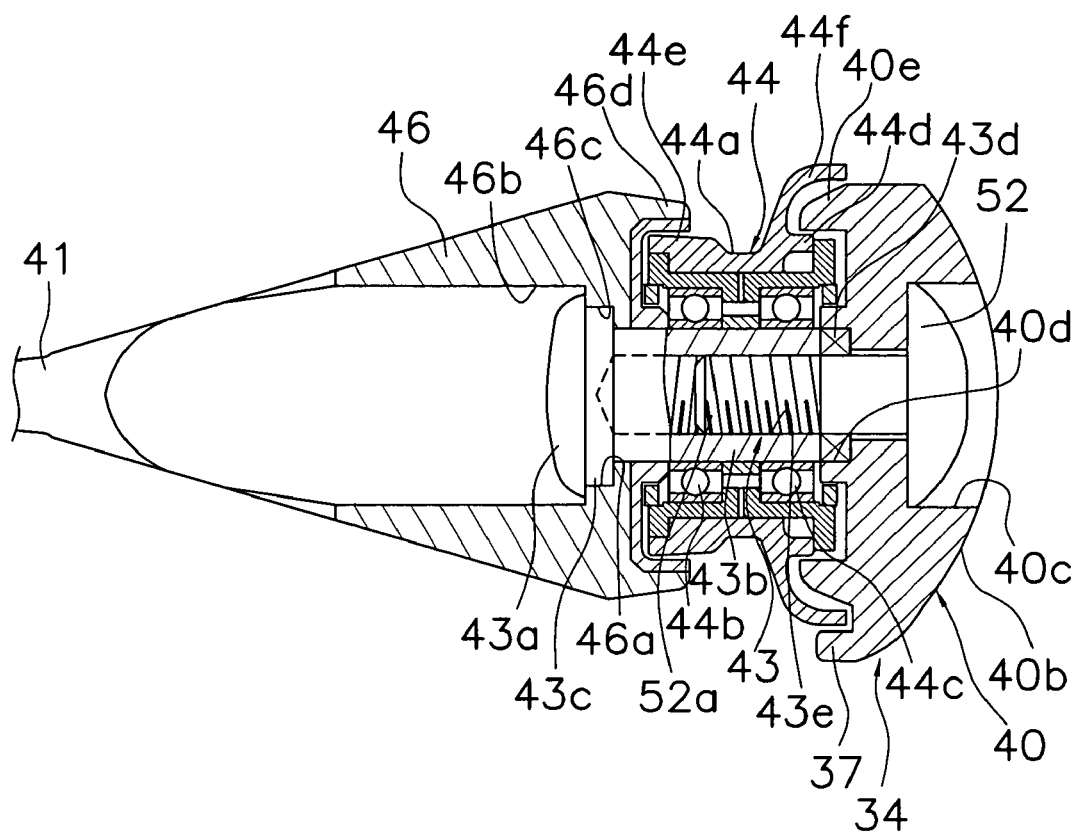
FIG. 6 is a partial horizontal cross-sectional view of the fishing line guide mechanism illustrated in FIGS. 1–4 in accordance with a first embodiment of the present invention.
Figure 7:
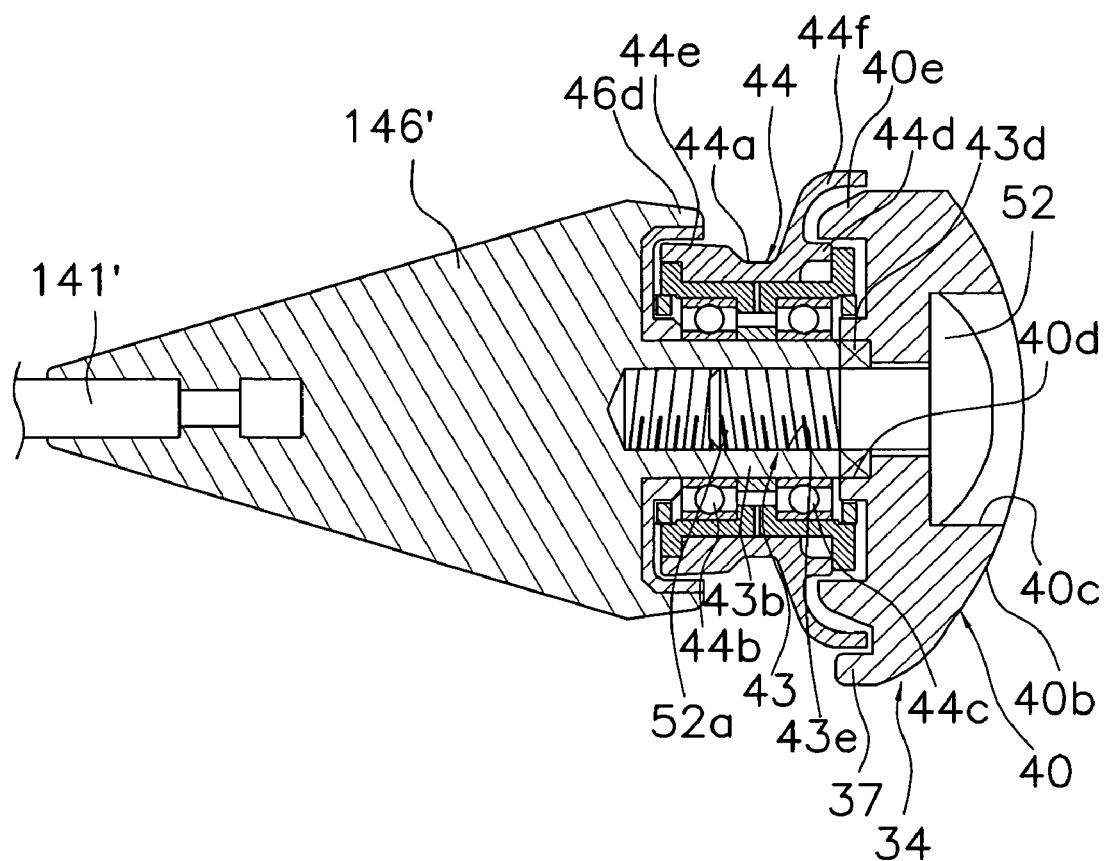
FIG. 7 is a partial horizontal cross-sectional view of the fishing line guide mechanism for a spinning reel in accordance with a second embodiment of the present invention.

Referring to FIGS. 1–6, the bail arm 34 further includes a bail 41, a fixed shaft 43, a line roller 44 and a fixed shaft cover 46. The bail 41 connects the first bail support member 40 and the second bail support member 42. Referring to FIGS. 5–7, the bail arm 34 has a support side shown on the right side of FIGS. 5–7 and a bail side shown on the left side of FIGS. 5–7. The support side of the fixed shaft 43 is fixed to the first bail support member 40 and a bail end of the fixed shaft 43 is coupled to the fixed shaft cover 46. The line roller 44 is supported by the fixed shaft 43. The fixed shaft cover 46 covers the fixed shaft 43. Exteriors of the fixed shaft cover 46, the bail 41 and the second bail support member 42 are integrally formed by a stainless steel alloy, for example, so that the exteriors thereof are smooth and continuous.

The fixed shaft 43, the fixed shaft cover 46, the bail 41 and the second bail support member 42 are made of a stainless steel alloy. However, it will be apparent to one of skill in the art from this disclosure that the material in the present invention is not limited to a stainless steel alloy and another metal material such as an aluminum alloy or a titanium alloy may be used.

The second bail support member 42 is integrally formed with the bail 41. However, it will be apparent to one of skill in the art from this disclosure that the second bail support member 42 and the bail 41 may be formed separately.

As shown in FIGS. 4 and 5, the first bail support member 40 includes an arm portion 40a and a ring-shaped mounting portion 40b. The first bail support member 40 is pivotably mounted on the first rotor arm 31. The ring-shaped mounting portion 40b is integrally formed with the arm portion 40a. The mounting portion 40b has a stepped through hole 40c and a fixing bolt 52. The fixing bolt 52 passes through the stepped through hole 40c to fix the fixed shaft 43 to the first bail support member 40. In addition, as shown in FIG. 5, the stepped through hole 40c has a first engaged portion 40d. The first engaged portion 40d has two recessed portions with which a portion of the fixed shaft 43 is non-rotatably engaged. The first engaged portion 40d is formed on a front rim portion of the stepped through hole 40c. In addition, as shown in FIG. 5, the first bail support member 40 further includes an annular first projecting portion 40e. The first projecting portion 40e projects from the first bail support member 40 towards the bail side of the bail arm 34.

Furthermore, as shown in FIGS. 1, 2, 4 and 6, an inner side portion of a tip of the arm portion 40a of the first bail support member 40 is formed to project out along the outer periphery of the line roller 44 further than other portions. The bail arm 34 further includes a line-pinch prevention member 37. The line-pinch prevention member 37 is unitarily formed with the inner side portion of the tip of the arm portion 40a. The line-pinch prevention member 37 prevents fishing line from being pinched between a component of the line roller 44 and the first projecting portion 40e. The line-pinch prevention member 37 protrudes so as to be smoothly continuous with the arm portion 40a.

As shown in FIG. 3, the bail 41 is a wire-shaped member made of a stainless steel alloy, for example. The bail 41 curves outward in the circumferential direction of the spool 4. The bail 41 has an end fastened to the second bail support member 42 and another end fastened to the fixed shaft cover 46. The bail 41 serves to guide fishing line to the line roller 44 when the bail arm 34 returns from the line-release position to the line-guiding position. As shown in FIGS. 3–5, the bail 41 is integrally formed with the fixed shaft cover 46. In addition, the bail side of the fixed shaft cover 46 is integrally formed with one end of the bail 41. As shown in FIGS. 1 and 3, the other end of the bail 41 is integrally formed with the second bail support member 42.

As shown in FIG. 5, the fixed shaft 43 is a bolt-shaped member formed separately from the fixed shaft cover 46. The fixed shaft 43 extends from the fixed shaft cover 46 toward the first bail support member 40. A support side of the fixed shaft 43 is fixed by the fixing bolt 52.

As shown in FIG. 5, the fixed shaft 43 includes a head portion 43a, a shaft portion 43b, a first engaging portion 43c, a second engaging portion 43d and a female-threaded section 43e. The line roller 44 is mounted on an outer periphery of the shaft portion 43b. The head portion 43a has a larger diameter than a diameter of the shaft portion 43b.

The second engaging portion 43d non-rotatably engages with the first engaged portion 40d of the stepped through hole 40c of the first bail support member 40. The second engaging portion 43d is formed on a support side of the shaft portion 43b. Portions of the second engaging portion 43d oppose each other and are formed so that the exteriors thereof are approximately the same as the first engaged portion 40d.

The first engaging portion 43c is formed on an outer periphery of a bail side of the shaft portion 43b. The exterior of the first engaging portion 43c is formed so that its cross section in the axial direction is non-circular, for example, an oval shape that has opposing parallel surfaces.

The female-threaded section 43e is formed on an inner periphery of the shaft portion 43b. The female-threaded section 43e is engaged with a male-threaded portion 52a of the fixing bolt 52. By engaging the male-threaded portion 52a with the female-threaded section 43e, the first bail support member 40 is fixed to the fixed shaft 43.

As shown in FIG. 5, the line roller 44 includes a cylindrical guide portion 44a, a bail side bearing 44b and a support side bearing 44c. An outer peripheral surface of the cylindrical guide portion 44a is provided with a groove for guiding the fishing line. The bail side and support side bearings 44b and 44c are arranged in a spaced relationship in the axial direction on an inner peripheral side of the guide portion 44a. The guide portion 44a is rotatably supported on the shaft portion 43b of the fixed shaft 43 via the bail side and support side bearings 44b and 44c. The guide portion 44a is more concave than surrounding portions and is shaped to easily guide fishing line.

As shown in FIG. 5, the line roller 44 further includes a tubular shaped first tubular portion 44d, a tubular shaped second tubular portion 44e and an annular flange portion 44f. The first tubular portion 44d is formed on a support side of the guide portion 44a. The second tubular portion 44e is formed on a bail side of the guide portion 44a. The flange portion 44f projects radially outward from a base of the first tubular portion 44d. Specifically, the flange portion 44f projects radially outward from an end portion of the guide portion closest to the first bail support member. The flange portion 44f covers an outer periphery of the first projecting portion 40e of the first bail support member 40. The first tubular portion 44d is covered by an inner periphery of the first projecting portion 40e. The flange portion 44f is formed with a larger diameter than diameters of the first tubular portion 44d and the second tubular portion 44e. The flange portion 44f is further formed as an annular member to project radially outward and toward the support side. The flange portion 44f covers an outer periphery of the first projection portion 40e of the first bail support member 40. As shown in FIG. 4, an outer peripheral portion of the flange portion 44f is exposed on a radially outer side of the first bail support member 40. In addition, as shown in FIGS. 4 and 6, the outer peripheral portion of the flange portion 44f is arranged so that a portion thereof is covered by the line-pinch prevention member 37. The line-pinch prevention member 37 prevents fishing line from being pinched between the flange portion 44f and the first projecting portion 40e.

Referring to FIGS. 4–6, the fixed shaft cover 46 is arranged on the bail side of the fixed shaft 43 in a spaced relationship with the mounting portion 40b of the first bail support member 40. The fixed shaft cover 46 is an approximately truncated conical member with a bail side being the vertex. The exterior of the fixed shaft cover 46 is formed with a smooth curved surface.

The fixed shaft 43 passes through the fixed shaft cover 46 from the bail side of the fixed shaft cover 46 such that it can be mounted from the bail side. The fixed shaft cover 46 includes a small diameter through hole 46a, a recessed portion 46b, a second engaged portion 46c and an annular second projecting portion 46d. The recessed portion 46b accommodates the head portion 43a of the fixed shaft 43. The recessed portion 46b is shaped into a closed-ended cylinder by a cutting process. Furthermore, the recessed portion 46b is formed on a bail side of the fixed shaft cover 46. The shaft portion 43b of the fixed shaft 43 is mounted on the support side of the recessed portion 46b. The small diameter through hole 46a is formed in the support side of the recessed portion 46b. The small diameter through hole 46a extends from the recessed portion 46b toward the support side of the fixed shaft cover 46. The second engaged portion 46c is engaged with the first engaging portion 43c of the fixed shaft 43. The second engaged portion 46c is formed on an inner periphery of the small diameter through hole 46a. By non-rotatably engaging the first engaging portion 43c with the second engaged portion 46c, the fixed shaft 43 is positioned with respect to the fixed shaft cover 46. The shaft portion 43b passes though the small diameter through hole 46a that is connected to the recessed portion 46b of the fixed shaft cover 46 and is mounted to the fixed shaft cover 46. The second engaged portion 46c is an oval shape having opposing parallel surfaces such that it is approximately the same as the exterior of the first engaging portion 43c. The annular second projecting portion 46*d* projects from the fixed shaft cover 46 towards the line roller 44. The second tubular portion 44*e* is covered by an inner periphery of the second projecting portion 46*d* of the fixed shaft cover 46.

In the aforementioned embodiment, a front drag type spinning reel was used as an example. It will be apparent to one of skill in the art from this disclosure that the present invention can also be applied to any type of spinning reel, such as a rear drag type spinning reel, a spinning reel that does not have a drag, a lever drag spinning reel, and the like.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

SECOND EMBODIMENT

Referring now to FIG. 7, a fishing line guide mechanism in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the aforementioned embodiment, the bail 41 is unitarily formed with the fixed shaft cover 46. The fishing line guide mechanism in the second embodiment is essentially the same as in the first embodiment however, as shown in FIG. 7, a bail 141' and a fixed shaft cover 146' are formed separately. In addition, in the first embodiment, the fixed shaft 43 and the fixed shaft cover 46 are arranged separately. However, as shown in FIG. 7, a configuration is possible in which the fixed shaft 143' and the fixed shaft cover 146' are unitarily formed. The bail 141' has a smaller diameter portion between two larger diameter portions. The fixed shaft cover 146' surrounds the smaller diameter portion and the two larger diameter portions so as to secure the bail 141' thereto.

THIRD EMBODIMENT

Figure 8:
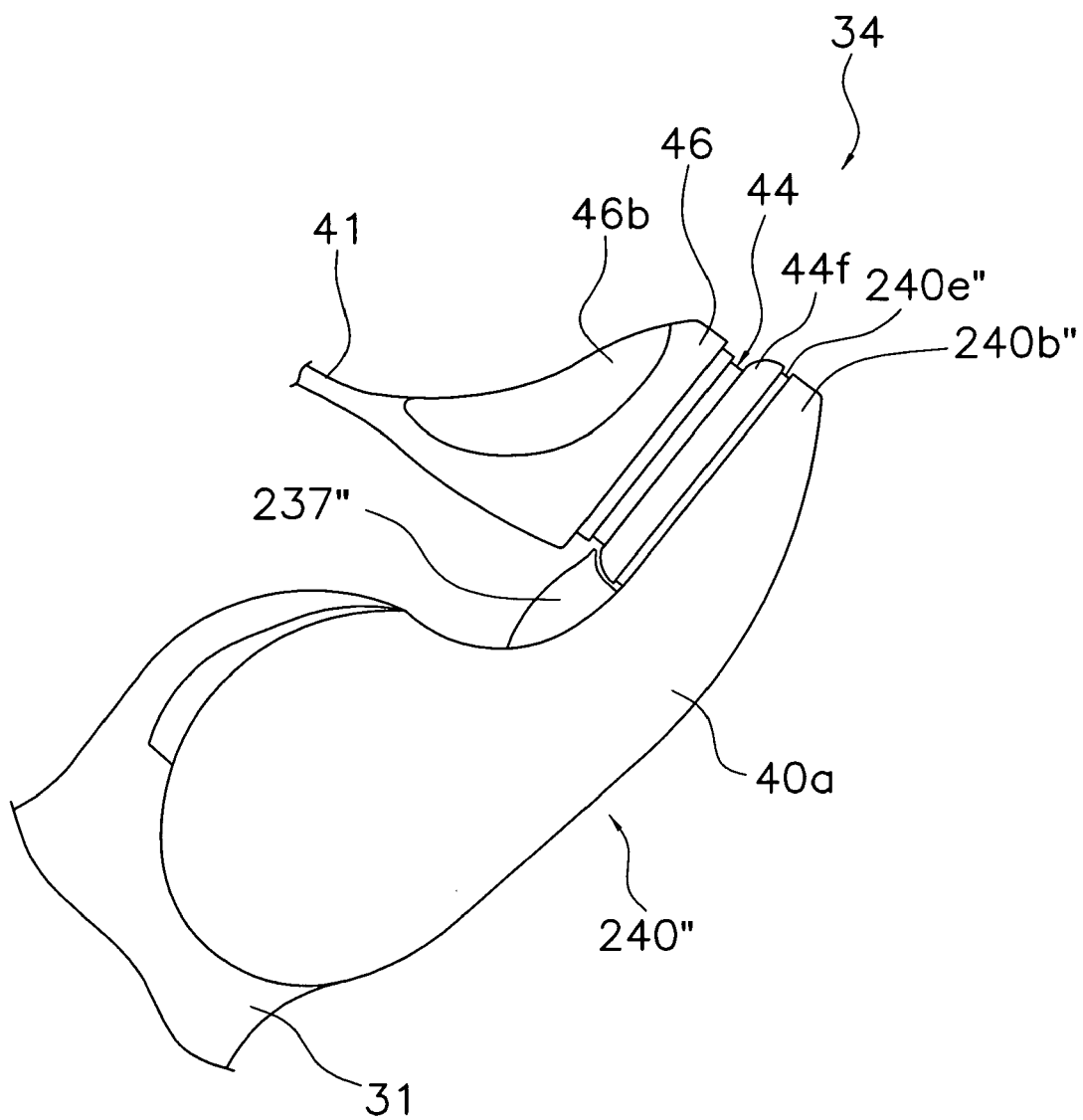
FIG. 8 is a partial view of the fishing line guide mechanism for a spinning reel in accordance with a third embodiment of the present invention.

Referring now to FIG. 8, a fishing line guide mechanism in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the first embodiment, the line-pinch prevention member 37 is unitarily formed with the mounting portion 40*b* of the first bail support member 40. The fishing line guide mechanism in the third embodiment is essentially the same as in the first embodiment however, a line-pinch prevention member 237" and a first bail support member 240" are formed separately. In addition, as shown in FIG. 8, the line-pinch prevention member 237" projects further out than other portions that project from the mounting portion 240*b*", such as the first projecting portion 240*e*". The line-pinch prevention member 237" projects axially towards the bail 41 and upwardly towards the line roller 44. Specifically, the line-pinch prevention member 237" is a rib that has a line slack prevention portion for guiding slack fishing line to the line roller 44. The line-pinch prevention member 237" is unitarily formed with the line-slack prevention portion so as to be continuously smooth therewith. The line-pinch prevention member 237" covers an outer periphery of the flange portion 44*f* to prevent the fishing line from being pinched between the flange portion 44*f* and the first projecting portion 240*e*". It will be apparent to one of skill in the art from this disclosure that it is possible to use a configuration in which the line-pinch prevention member 237" and the line slack prevention portion are not provided.

FOURTH EMBODIMENT

Figure 9:
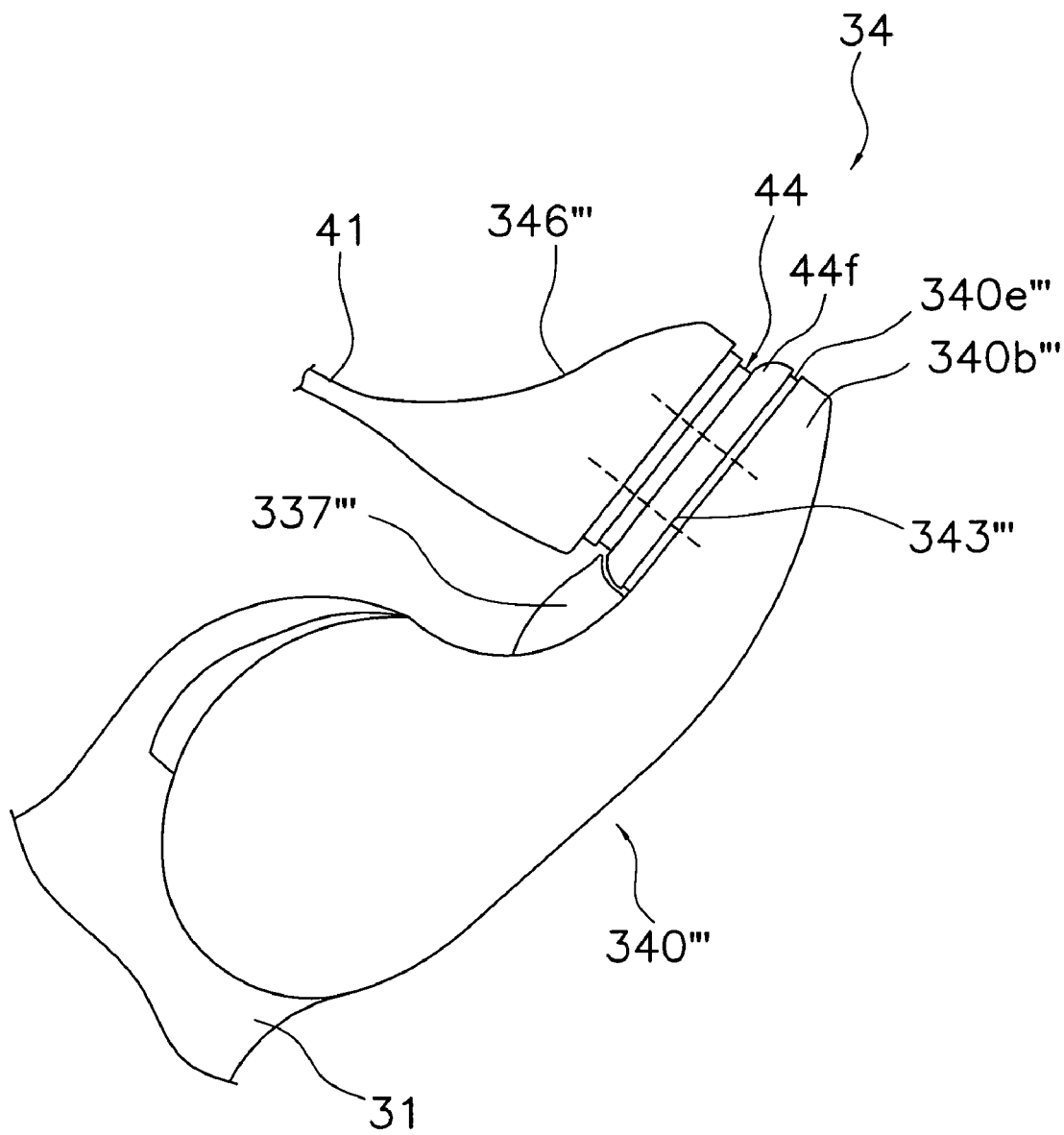
FIG. 9 is a partial view of the fishing line guide mechanism for a spinning reel in accordance with a fourth embodiment of the present invention.

Referring now to FIG. 9, a fishing line guide mechanism in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The fishing line guide mechanism in the fourth embodiment is essentially the same as in the first embodiment. However, the fourth embodiment is a combination of the second and third embodiments. As in the second embodiment, the fourth embodiment has a fixed shaft 343''' and a fixed shaft cover 346''' that are unitarily formed. In the fourth embodiment, the line-pinch prevention member 337''' and the first bail support member 340''' are formed separately. In addition, as shown in FIG. 9, the line-pinch prevention member 337''' projects further out than other portions that project from the mounting portion 340*b*''', such as the first projecting portion 340*e*'''. The line-pinch prevention member 337''' projects axially towards the bail 41 and upwardly towards the line roller 44. Specifically, the line-pinch prevention member 337''' is a rib that has a line slack prevention portion for guiding slack fishing line to the line roller 44. The line-pinch prevention member 337''' is unitarily formed with the line-slack prevention portion so as to be continuously smooth therewith. The line-pinch prevention member 337''' covers an outer periphery of the flange portion 44*f* to prevent the fishing line from being pinched between the flange portion 44*f* and the first projecting portion 340*e*'''. It will be apparent to one of skill in the art from this disclosure that it is possible to use a configuration in which the line-pinch prevention member 337''' and the line slack prevention portion are not provided.

In the above embodiments, the line roller 44 has the bail side and support side bearings 44*b* and 44*c*. However, a configuration is possible in which only one bearing is provided. Another configuration is possible in which a bearing is not provided and the guide portion 44*a* is formed as a bushing that is rotatable with respect to the fixed shaft 43. In addition, a configuration is possible in which the first tubular portion 44*d* or the second tubular portion 44*e* are not covered by the first projecting portion 40*e* of the first bail support member 40 or the second projecting portion 46*d* of the fixed shaft cover 46, respectively. In addition, a configuration is also possible in which the first tubular portion 44*d* is not provided.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A fishing line guide mechanism for a spinning reel comprising:
   first and second rotor arms;
   a first bail support member pivotably mounted to a front end of the first rotor arm, and having an annular first projecting portion;
   a second bail support member pivotably mounted to a front end of the second rotor arm;
   a fixed shaft in which one end thereof is fixed to the first bail support member;
   a fixed shaft cover formed on another end of the fixed shaft in a spaced relationship with the first bail support member;
   a line roller rotatably supported by the fixed shaft, and including a guide portion configured to guide fishing line and a flange portion that projects radially outward from an end portion of the guide portion closest to the first bail support member, the flange portion covering an outer periphery of the first projecting portion of the first bail support member, at least part of an outer peripheral portion of the flange portion being exposed on a radially outer side of the first bail support member; and
   a bail having an end fixed to the second bail support member and another end fixed to at least one of the fixed shaft and the fixed shaft cover, the bail being curved outward in a circumferential direction to guide the fishing line to the line roller.

2. A fishing line guide mechanism of a spinning reel comprising:
   first and second rotor arms;
   a first bail support member pivotably mounted to a front end of the first rotor arm, and having an annular first projecting portion;
   a second bail support member pivotably mounted to a front end of the second rotor arm;
   a fixed shaft in which one end thereof is fixed to the first bail support member;
   a fixed shaft cover formed on another end of the fixed shaft in a spaced relationship with the first bail support member;
   a line roller rotatably supported by the fixed shaft, and including a guide portion configured to guide fishing line and a flange portion that projects radially outward from an end portion of the guide portion closest to the first bail support member, the flange portion covering an outer periphery of the first projecting portion of the first bail support member; and
   a bail having an end fixed to the second bail support member and another end fixed to at least one of the fixed shaft and the fixed shaft cover, the bail being curved outward in a circumferential direction to guide the fishing line to the line roller,
   the line roller further having a first tubular portion that is formed to project axially outward from an end portion of the guide portion closest to the first bail support member, and is covered by an inner periphery of the first projecting portion.

3. The fishing line guide mechanism of a spinning reel according to claim 1, wherein
   the fixed shaft cover has an annular second projecting portion that faces the first projecting portion.

4. The fishing line guide mechanism of a spinning reel according to claim 3, wherein
   the line roller further has a second tubular portion that projects axially outward from an end portion of the guide portion closest to the bail and is covered by an inner periphery of the second projecting portion.

5. The fishing line guide mechanism of a spinning reel according to claim 2, wherein
   the fixed shaft cover has an annular second projecting portion that faces the first projecting portion.

6. The fishing line guide mechanism of a spinning reel according to claim 5, wherein
   the line roller further has a second tubular portion that projects axially outward from an end portion of the guide portion closest to the bail and is covered by an inner periphery of the second projecting portion.

7. The fishing line guide mechanism of a spinning reel according to claim 1, further comprising
   a line-pinch prevention member projecting further out than the first projecting portion of the first bail support member and covering an outer periphery of the flange portion to prevent the fishing line from being pinched between the flange portion and the first projecting portion.

8. The fishing line guide mechanism of a spinning reel according to claim 7, wherein
   the line-pinch prevention portion is formed separately from the first bail support member.

9. The fishing line guide mechanism of a spinning reel according to claim 7, wherein
   the line-pinch prevention member is unitarily formed with the first bail support member.

10. The fishing line guide mechanism of a spinning reel according to claim 7, wherein
    the line-pinch prevention member has a line slack prevention portion that prevents fishing line slack, and the line slack prevention portion is unitarily formed with the line-pinch prevention member so as to be continuously smooth therewith.

11. A spinning reel comprising:
    a reel unit;
    a rotor rotatively supported on a front of the reel unit;
    a spool disposed at a front of the rotor; and
    a fishing line guide mechanism including:
    first and second rotor arms,
    a first bail support member pivotably mounted to a front end of the first rotor arm, having an annular first projecting portion,
    a second bail support member pivotably mounted to a front end of the second rotor arm,
    a fixed shaft in which one end thereof is fixed to the first bail support member,
    a fixed shaft cover formed on another end of the fixed shaft in a spaced relationship with the first bail support member, a line roller rotatably supported by the fixed shaft, and including a guide portion configured to guide fishing line and a flange portion that projects radially outward from an end portion of the guide portion closest to the first bail support member, the flange portion covering an outer periphery of the first projecting portion of the first bail support member, at least part of an outer peripheral portion of the flange portion being exposed on a radially outer side of the first bail support member, and a bail having an end fixed to the second bail support member and another end fixed to at least one of the fixed shaft and the fixed shaft cover, the bail being curved outward in a circumferential direction to guide the fishing line to the line roller.

12. A spinning reel comprising:

a reel unit;

a rotor rotatively supported on a front of the reel unit;

a spool disposed at a front of the rotor; and a fishing line guide mechanism including:

first and second rotor arms, a first bail support member pivotably mounted to a front end of the first rotor arm, having an annular first projecting portion, a second bail support member pivotably mounted to a front end of the second rotor arm, a fixed shaft in which one end thereof is fixed to the first bail support member, a fixed shaft cover formed on another end of the fixed shaft in a spaced relationship with the first bail support member, a line roller rotatably supported by the fixed shaft, and including a guide portion configured to guide fishing line and a flange portion that projects radially outward from an end portion of the guide portion closest to the first bail support member, the flange portion covering an outer periphery of the first projecting portion of the first bail support member, and a bail having an end fixed to the second bail support member and another end fixed to at least one of the fixed shaft and the fixed shaft cover, the bail being curved outward in a circumferential direction to guide the fishing line to the line roller, the line roller further having a first tubular portion that is formed to project axially outward from an end portion of the guide portion closest to the first bail support member, and is covered by an inner periphery of the first projecting portion.

13. The spinning reel according to claim 11, wherein the fixed shaft cover has an annular second projecting portion that faces the first projecting portion.

14. The spinning reel according to claim 13, wherein the line roller further has a second tubular portion that projects axially outward from an end portion of the guide portion closest to the bail and is covered by an inner periphery of the second projecting portion.

15. The spinning reel according to claim 12, wherein the fixed shaft cover has an annular second projecting portion that faces the first projecting portion.

16. The spinning reel according to claim 15, wherein the line roller further has a second tubular portion that projects axially outward from an end portion of the guide portion closest to the bail and is covered by an inner periphery of the second projecting portion.

17. The spinning reel according to claim 11, further comprising a line-pinch prevention member projecting further out than the first projecting portion of the first bail support member and covering an outer periphery of the flange portion to prevent the fishing line from being pinched between the flange portion and the first projecting portion.

18. The spinning reel according to claim 17, wherein the line-pinch prevention member is formed separately from the first bail support member.

19. The spinning reel according to claim 17, wherein the line-pinch prevention member is unitarily formed with the first bail support member.

20. The spinning reel according to claim 17, wherein the line-pinch prevention member has a line slack prevention portion that prevents fishing line slack, and the line slack prevention portion is unitarily formed with the line-pinch prevention member so as to be continuously smooth therewith.

* * * * *